United States Patent [19]

Wolfe

[11] 3,869,482

[45] Mar. 4, 1975

[54] METHOD OF PRODUCING HIGHLY PURIFIED PHOSPHATIDES

[75] Inventor: Werner Wolfe, Vienna, Austria

[73] Assignee: Etapharm chem. pharm. Laboratorium G.m.b.H., Wien XIX, Austria

[22] Filed: July 27, 1973

[21] Appl. No.: 383,041

[52] U.S. Cl. ............................................ 260/403
[51] Int. Cl. ........................... A23j 7/00, C07f 9/02
[58] Field of Search .................................. 260/403

[56] References Cited
UNITED STATES PATENTS
3,436,413    4/1969    Okany ............................... 260/403

*Primary Examiner*—Elbert L. Roberts
*Attorney, Agent, or Firm*—Watson, Cole, Grindle & Watson

[57] ABSTRACT

A method of producing highly purified phosphatides from the total lipoid extract of animal organs comprises (a) completely freeing a total lipoid extract of proteins by a determined solvent treatment, and from this prepurified total lipoid extract either (b) first removing the water soluble impurities by a special washing operation and then for the purpose of producing the very pure phosphatide mixture (c) separating the other phosphorus-free lipoids by an adsorption process, or else first effecting the adsorption and then the washing operation.

10 Claims, No Drawings

METHOD OF PRODUCING HIGHLY PURIFIED PHOSPHATIDES

The invention relates to a method of producing highly purified phosphatides from animal organs. Phosphatides or mixtures of phosphatides always occur in animal organs together with accompanying substances which are disturbing or unsuitable for subsequent use and therefore have to be separated. The following may be mentioned as examples of such accompanying substances: peptides, amino acids, sterols, sterol esters, mono-, di-, and triglycerides, free fatty acids, and sugar.

Various descriptions have already been given of methods of producing and purifying phosphatides. Thus DL-PS 62 400 describes the extraction of material containing vegetable phosphatides by means of alcohol and chloroform, the solvent being drawn off in vacuo from the insoluble matter after filtration. A method of production of this kind leads to phosphatide mixtures the degree of purity of which still leaves very much to be desired. If for example a phosphatide—containing material derived from animal organs were treated in this way, the phosphatides would still contain impurities including sugar and amino acids.

The measures proposed by DT-AS 1,241,559 and also by GB-PS No. 896,903 for the production of a phosphatide having a high arachidonic acid content by means of four process stages are also inadequate if very pure phosphatides are desired. By this new method a total lipoid extract must first be produced in two stages of the process by successive dehydration of an animal organ with alcohol and extraction of all the lipoids with petroleum ether, this extract then being extracted with aliphatic ketones, whereby however it is only incompletely freed of neutral fats and glycerides, while finally it is processed by extraction with an aliphatic ester or alcohol-chlorinated hydrocarbon mixture and separation of the phosphatide mixture from this extraction solution by cooling. These two treatment processes to which the previously obtained total lipoid extract is subjected are however not sufficient to obtain phosphatides which are not only free of water soluble non-phosphatidic accompanying substances but also contain no neutral fats and glycerides. This is also true of the multi-stage process according to DT-PS No. 635,325 for producing lipoids from tissues of the central nervous system, in which the total lipoids are first obtained in three successive stages by means of determined solvents, and then have to be freed of cholesterol and water soluble impurities by means of special treatment with acetone; the native composition is not retained by this means and the extensive separation of phosphorus-free lipoids from the phosphatides which is necessary for a pure product is not achieved.

The problem underlying the invention consists in obtaining a very pure phosphatide mixture from the total lipoid extract of animal organs, in order to enable an injectable, stable aqueous dispersion to be made therefrom. In addition, the native composition of the phosphatides should to a very large extent be retained.

The method according to the invention is based in principle on completely freeing a total lipoid extract of proteins by a determined solvent treatment, and from this prepurified total lipoid extract either first removing the water soluble impurities by a special washing operation and then for the purpose of producing the very pure phosphatide mixture separating the other phosphorus-free lipoids by an adsorption process, or else first effecting the adsorption and then the washing operation.

In explanation of the desired particularly great purity it may be mentioned that the phosphatide mixture to be obtained must be free of albumen and of peptides, and in addition must to a very large extent be freed of amino acids, sterols, sterol esters, mono-, di-, and triglycerides, free fatty acids and sugars. In the native composition of the phosphatides there must be no alteration in the composition of the individual components which is specific to the individual organs. This means for example that the aldehyde contents must be retained as a measure of the contents of plasmalogens (acetal phosphatides) and that no alteration, such as the formation of epoxides or hydrogen peroxide, may occur in the fatty acid pattern. Furthermore, the process for the purification of phosphatides must not lead to any substantial increase in the content of lyso compounds, that is to say hydrolytic splitting must be avoided. It also follows that the crude phosphatide extract must only be treated carefully with neutral salt solutions, while the additional restriction must be imposed that calcium and potassium ions must not be present in the purification operations, because these ions are bound by the phosphatides by salt formation and also adsorption, so that they may have a detrimental influence on subsequent pharmaceutical utilisation.

According to the present invention the problem referred to is solved by subjecting the total lipoid extract, which has been obtained from animal organs, for example from brain and nerve tissue, retina, hearts, testicles, or yolks, by extraction with organic solvents, such as for example methanol-chloroform or ethanol-diethyl ether, to a three-stage purification process which will be explained more fully below. For the complete purification of the phosphatides it is important that the lipoproteides of the total lipoid extract should first be split up into lipoids and proteins and the proteins removed therefrom.

According to the invention therefore in the first purification stage (a) the total lipoid extract is taken up a number of times in alcohol-containing solvents, heated to temperatures of up to 40°C, and the solvent is carefully drawn off in vacuo. The alcohol-containing solvents used may be mixtures of low molecular alcohols and non-polar or slightly polar organic solvents the boiling points of which do not exceed 100°C, optionally with a low water content. Suitable alcohol-containing solvents are for example mixtures of methanol, chloroform, and optionally water, or mixtures of ethanol and benzene.

A mixture of methanol, chloroform, and water is first used, then a mixture of ethanol and benzene, and finally a mixture of methanol and chloroform.

The product obtained after repeated treatment with alcohol-containing solvents and under careful drying conditions, that is to say the dried extract, is then mixed with petroleum ether and allowed to stand for some time under the protection of an inert gas at freezing cabinet temperatures, for example at −20°C for one day, or for a still shorter time at lower temperatures. The proteins precipitated after this treatment are separated by centrifuging from the petroleum ether solution containing the lipoids.

This separation treatment is preferably repeated on the residue which has been freed of petroleum ether by evaporation in vacuo at 40°C and dried, but in this case the treatment is not effected with petroleum ether but with an alcohol-containing solvent, for example a mixture of methanol and chloroform, so that complete removal of the proteins is ensured.

In the second purification stage b) the extract, which has been freed from the proteins and thereupon freed from the solvent by evaporation in vacuo and which in addition to the lipoids also contains the water-soluble accompanying substances, is mixed for the purpose of complete removal of the water-soluble accompanying substances with a solvent which is polar or slightly polar and in the case of phosphatides prevents the formation of micellar structures, and which should also be immiscible or only slightly miscible with water. The solution obtained in this manner is washed a number of times with sodium salt solutions and thereupon with water. It is advantageous for ethyl acetate, diethyl ether, and chloroform, or mixtures containing these substances to be used as polar or slightly polar solvents. For the purpose of washing with sodium salt solutions, aqueous sodium chloride solutions of various concentrations, for example saturated solutions, are used. The solution purified in this manner is freed of water and evaporated in vacuo until free of solvent.

In the third purification stage c) the evaporation residue from the second purification stage, after being freed of water and solvent, is again mixed with organic but non-polar solvents, or in the case of phosphatides with solvents permitting the formation of micelles, the boiling points of the solvents being under 100°C. For the production of this solution it is advantageous to use pentane, hexane, heptane, and mixtures of these hydrocarbons, including petroleum ether. For the purpose of thereupon separating lipoids free of phosphorus, for example mono-, di-, and triglycerides, the hydrocarbon solution is filtered through silica gel, advantageously through a column filled with silica gel.

In the purification process according to the invention the second purification stage b) can be transposed in sequence with the third purification stage c) without impairing the purification effect.

The phosphatide mixture obtained by the method according to the invention is characterised by great purity and is therefore very suitable for producing injectable, stable aqueous dispersions. In addition, the native composition of the phosphatide mixture is substantially retained and its use for pharmaceutical preparations is very advantageous.

The highly purified organospecific phosphatides obtained according to the invention are suitable because of their organotropic action for the treatment of diseases of internal organs. For example retina phosphatides can be successfully used in the treatment of maculopathies, metamorphopsies and juvenile forms of retinitis pigmentosa.

The invention will be explained below with the aid of the following examples, without being restricted thereto:

EXAMPLE 1 a) 9.2 g total lipoid extract from calves' hearts were mixed with 500 ml of a mixture of chloroform, methanol, and water in the proportion 16 : 8 : 1, and the turbid solution was evaporated in vacuo at 40°C. This process was repeated with the same amount of solvent. After evaporation once more the residue was dissolved in 50 ml benzene and this solution was mixed with the same volume of ethanol and again evaporated in vacuo at 40°C. This step was also repeated with the same amounts of solvent. The evaporation residue was then dried over silica gel for 18 hours in a vacuum desiccator. It was then mixed with 500 ml of petroleum ether (boiling range 40° – 60°C) and the air in the flask was displaced by $N_2$. This solution was then allowed to stand for 24 hours at $-20°C$ in a deep freeze chest. Centrifuging in the cold state was then effected for 30 minutes at 4000 rpm. The clear solution was poured off and evaporated to dryness in vacuo at 40°C. The evaporation residue was dissolved in 50 ml chloroform and mixed with the same volume of methanol. It was then allowed to stand for 15 hours in a deep freeze chest at $-20°C$, whereupon the precipitate formed was separated by centrifuging at 10 minutes at 3000 rpm. The resulting clear solution was evaporated in vacuo at 40°C. Yield: 8.8g. b) The extract (8.8 g) freed from proteins and alcohol-containing solvent was dissolved in 100 ml ether and shaken up three times with 100 ml of saturated common salt solution each time. The ether phase was then shaken up once with 100 ml of water. The formation of emulsion was prevented by carefully adding a few drops of ethanol. The ether phase was dried over $Na_2SO_4$ and evaporated at 40°C in vacuo. Yield: 6.1 g. The product was free from amino acids, peptides, and carbohydrates.

c) 6 g of the pre-purified extract were dissolved in 14 g hexane and filtered through a chromatography column filled with 12 g of silica gel made by Merck of Darmstadt. After the solution had passed through the column, the latter was eluted with 36 ml hexane. The total hexane eluate was evaporated at 40°C in vacuo. Yield: 4.1 g. The product was free of glycerides, sterols, and sterol esters, free fatty acids, and other phosphorus-free lipoids. The phosphorus content amounted to 3.87%.

EXAMPLE 2

5 g of a total lipoid extract obtained from pig retinas were pre-purified as in Example 1, by the procedure described in a). The product pre-purified in this manner was then first further purified by the procedure described in c) and then by the procedure described in b). Yield: 2.8 g.

The product was free of proteins, peptides, amino acids, carbohydrates, and phosphorus-free lipoids. The phosphorus content amounted to 3.67%.

EXAMPLE 3

10 g of a total lipoid extract obtained from pig liver was pre-purified as in Example 1 by the procedure described there in a). The pre-purified product was further purified as described in b), a mixture of methanol and chloroform being used instead of ether.

The product purified in this manner was then freed of phosphorus-free lipoids by the procedure described in c), petroleum ether (boiling range 40° – 60°C) being used instead of hexane. The yield amounted to 4.8 g. The product was free of proteins, peptides, amino acids, carbohydrates, and phophorus-free lipoids. The phosphorus content amounted to 3.68%.

What I claim is:

1. A method for producing highly purified phosphatides from a total lipoid extract derived by organic solvent extraction from animal organs, said method comprising:
   a. admixing a total lipoid extract which contains phosphatides with an alcohol-containing solvent having a boiling point which does not exceed 100°C and thereafter subjecting the lipoid extract to evaporation in vacuo at a temperature not greater than 40°C to present a dried phosphatide containing extract;
   b. repeating step (a) a plurality of times to thereby prepare a multiple solvent extracted, dried phosphatide containing material;
   c. mixing said multiple solvent extracted, dried, phosphatide containing material with petroleum ether and allowing such mixture to stand under the protection of an inert gas at freezing cabinet temperatures until proteins originally present in said dried material are precipitated;
   d. separating precipitated proteins from the remainder of the mixture and removing the petroleum ether from the latter to thereby present a dry intermediate substance containing phosphatides which are contaminated with substantially less proteinaceous matter than said multiply solvent extracted, dried, phosphatide containing material;
   e. removing water-soluble substances from the phosphatides from which proteins have been separated in step (d) by admixing such phosphatides with a polar solvent which is incapable of permitting the formation of micellar structures from phosphatides, washing such admixture with neutral aqueous sodium salt solutions and water, and thereafter separating the polar solvent and water from the phosphatides which are thereby substantially free from water-soluble substances; and
   f. mixing the phosphatides from which proteins have been separated in step (d) with a non-polar solvent in which phosphatides form miscellar structures, contacting the mixture of phosphatides and non-polar solvent with silica gel, and thereafter separating the non-polar solvent from the phosphatides which are thereby free of impurities capable of being adsorbed by said silica gel.

2. A method as claimed in claim 1 wherein the alcohol-containing solvent comprises a mixture of methanol and chloroform.

3. A method as claimed in claim 1 wherein the alcohol-containing solvent comprises a mixture of ethanol and benzene.

4. A method according to claim 1 wherein diethyl ether, ethyl acetate or chloroform or mixtures containing these substances are used as said polar solvent.

5. A method according to claim 1 wherein pentane, hexane, heptane or mixtures thereof, including petroleum ether, are used as said non-polar solvent.

6. A method as set forth in claim 1 wherein step (e) is carried out prior to step (f).

7. A method as set forth in claim 1 wherein step (f) is carried out prior to step (e).

8. A method as set forth in claim 1 wherein is included the steps of: mixing the dry intermediate substance containing phosphatides from which proteins have been separated with an alcohol-containing solvent capable of precipitating proteins in the presence of phosphatides; allowing such mixture to stand under the protection of an inert gas at freezing cabinet temperatures until further proteins are precipitated; and removing the alcohol-containing solvent and the further precipitated proteins from the phosphatides.

9. A method as set forth in claim 1 wherein step (a) is first carried out using a mixture of methanol, chloroform and water as the alcohol-containing solvent; thereafter step (a) is repeated using a mixture of ethanol and benzene as the alcohol-containing solvent; and finally step (a) is repeated again using a mixture of methanol and chloroform as the alcohol-containing solvent.

10. Highly purified phosphatides produced by the process of claim 1.

* * * * *